US008526430B2

(12) United States Patent
Jeon et al.

(10) Patent No.: US 8,526,430 B2
(45) Date of Patent: Sep. 3, 2013

(54) MULTI-HOP COMMUNICATION METHOD BASED ON DISTRIBUTED MEDIUM ACCESS CONTROL

(75) Inventors: Young-Ae Jeon, Daejeon (KR); Sang-Jae Lee, Daejeon (KR); Sang-Sung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 214 days.

(21) Appl. No.: 12/967,687

(22) Filed: Dec. 14, 2010

(65) Prior Publication Data

US 2011/0149958 A1    Jun. 23, 2011

(30) Foreign Application Priority Data

Dec. 21, 2009  (KR) ................. 10-2009-0128250

(51) Int. Cl.
*H04L 12/28* (2006.01)
(52) U.S. Cl.
USPC ............................ 370/389; 370/328; 370/329
(58) Field of Classification Search
USPC .......................................................... 370/389
See application file for complete search history.

(56) References Cited

U.S. PATENT DOCUMENTS

| | | | | |
|---|---|---|---|---|
| 6,671,819 B1 * | 12/2003 | Passman et al. | ................ | 714/4.1 |
| 7,292,842 B2 * | 11/2007 | Suzuki | ................... | 455/411 |
| 7,672,289 B2 * | 3/2010 | Bhatti | ..................... | 370/349 |
| 8,045,502 B2 * | 10/2011 | Chou | ..................... | 370/322 |
| 8,214,500 B2 * | 7/2012 | Chang et al. | .............. | 709/226 |
| 8,243,710 B1 * | 8/2012 | Benveniste | ................ | 370/344 |
| 2007/0110102 A1 * | 5/2007 | Yagyuu et al. | ............. | 370/470 |

FOREIGN PATENT DOCUMENTS

| | | |
|---|---|---|
| JP | 2004-253885 | 9/2004 |
| KR | 10-2004-0095152 | 11/2004 |
| KR | 10-2005-0028197 | 3/2005 |
| KR | 10-0650114 | 11/2006 |
| KR | 10-2009-0008301 | 10/2008 |
| KR | 10-2009-0026739 | 3/2009 |
| WO | WO 2007/125513 | 11/2007 |
| WO | WO 2009/035263 | 3/2009 |

* cited by examiner

*Primary Examiner* — Ian N Moore
*Assistant Examiner* — Lakeram Jangbahadur
(74) *Attorney, Agent, or Firm* — Staas & Halsey LLP

(57) ABSTRACT

Disclosed herein is a multi-hop communication method based on distributed medium access control. In the multi-hop communication method based on distributed medium access control according to the present invention, a beacon frame which includes a first multi-hop information element is generated and transmitted to a neighboring device so as to search for a route to an external device which does not belong to a beacon group. A third multi-hop information element, which is generated based on a second multi-hop information element generated by the external device, is received from the neighboring device. A multi-hop route to the external device is set up in accordance with the third multi-hop information element, and data is transmitted to the external device. Therefore, a multi-hop route between devices in the extended beacon group can be efficiently set up.

8 Claims, 7 Drawing Sheets

FIG. 4

| | Octets | Field name |
|---|---|---|
| 410 | 1 | Element ID |
| 420 | 1 | Length (= 20 + 4xN) |
| 430 | 2 | MDRP Control |
| 441 | 2 | Target/Owner DevAddr |
| 442 | 2 | SrcAddr |
| 443 | 2 | DestAddr |
| 451 | 4 | MinBW |
| 452 | 4 | DesiredBW |
| 460 | 1 | HopCnt |
| 470 | 2 | MASNum |
| 480 | 1 | Sequence Num |
| 490 | 4 | DRP Allocation 1 |
| | | ... |
| | 4 | DRP Allocation N |

FIG. 5

| | Bits | Field name |
|---|---|---|
| | b13-15 | Reserved |
| 510 | b12 | Unsafe |
| 520 | b11 | Conflict Tie-breaker |
| 530 | b10 | Owner |
| 540 | b9 | Reservation Status |
| 550 | b8-b6 | Reason Code |
| 560 | b5-b3 | Stream Index |
| 570 | b2-b0 | Reservation type |

MULTI-HOP COMMUNICATION METHOD BASED ON DISTRIBUTED MEDIUM ACCESS CONTROL

CROSS REFERENCE TO RELATED APPLICATION

This application claims the benefit of Korean Patent Application No. 10-2009-0128250, filed on Dec. 21, 2009, which is hereby incorporated by reference in its entirety into this application.

BACKGROUND OF THE INVENTION

1. Technical Field

The present invention relates generally to a multi-hop communication technology, and, more particularly, to multi-hop routing between devices located in an extended beacon group in a wireless communication network based on distributed medium access control.

2. Description of the Related Art

A high-speed wireless communication network based on Distributed Medium Access Control (DMAC) specified by the WiMedia Alliance is a technology that supports various types of services by wirelessly connecting audio/video devices, computers, peripherals, etc. which are located at a short distance and in a single beacon group, and by supporting communication between small-sized multimedia devices which are conveniently portable and are operated at low power.

Generally, in high-speed wireless communication networks, connection, that is, communication, among two or more devices is initiated by the transmission/reception of beacons among devices which are present in a Beacon Group (BG) and which share the same Beacon Period Start Time (BPST) with one another. However, an Extended Beacon Group (EBG) which is the union of the BGs of all devices present in relevant BGs cannot set up the routes of all the devices using only single-hop communication.

That is, devices which share the same BPST and belong to the single BG can communicate with one another in a single-hop manner, but devices which belong to different BGs cannot set up their routes in a single-hop manner. Therefore, a new type of communication technology that allows two devices, which are present in an EBG and belong to different BGs, to set up their routes and communicate with each other is urgently required.

SUMMARY OF THE INVENTION

Accordingly, the present invention has been made keeping in mind the above problems occurring in the prior art, and an object of the present invention is to provide a technology that enables multi-hop communication between devices in an Extended Beacon Group (EBG), as well as single-hop communication between devices only in a single beacon group based on distributed medium access control.

Another object of the present invention is to define multi-hop information elements that can be effectively used in multi-hop communication based on distributed medium access control.

A further object of the present invention is to set up an optimal route in distributed medium access control-based multi-hop communication that uses multi-rate.

In accordance with an aspect of the present invention to accomplish the above objects, there is provided a multi-hop communication method based on distributed medium access control, including, from the standpoint of an initial source device, generating a beacon frame which includes a first multi-hop information element and transmitting the beacon frame to a neighboring device so as to search for a route to an external device which does not belong to a beacon group; receiving a third multi-hop information element, which is generated based on a second multi-hop information element generated by the external device, from the neighboring device; and setting up a multi-hop route to the external device in accordance with the third multi-hop information element and transmitting data to the external device.

Preferably, the first multi-hop information element may be included in a beacon frame transmitted from an initial source device of the multi-hop route, the second multi-hop information element may be included in a beacon frame transmitted from a final destination device of the multi-hop route, and the third multi-hop information element may be included in a beacon frame transmitted from a neighboring device present in a beacon group of the initial source device of the multi-hop route.

Preferably, each of the multi-hop information elements may include a field for indicating an initial source (an initial source device) of the route, a field for indicating a final destination (a final destination device) of the route, a field for indicating a hop count, a field for indicating the amount of required resources, and a field for indicating resource allocation information. In this case, the amount of required resources may be the number of required Medium Access Slots (MASs), and the resource allocation information may be information about allocated time slots.

Preferably, the third multi-hop information element may include resource allocation information including the second multi-hop information element, without change. That is, in the third multi-hop information element, resource allocation information generated by the current device may be additionally recorded in addition to resource allocation information included in the second multi-hop information element.

Preferably, in order to release the multi-hop route, a beacon frame from which the first multi-hop information element has been deleted may be transmitted to the neighboring device.

In accordance with another aspect of the present invention to accomplish the above objects, there is provided a multi-hop communication method based on distributed medium access control, including, from the standpoint of a final destination device, receiving a first multi-hop information element generated to search for a multi-hop route and determining whether a final destination of the multi-hop route is a current device; if the final destination is the current device, determining whether to select a multi-hop route including a device which transmitted the first multi-hop information element; if the multi-hop route is selected, generating a second multi-hop information element including resource allocation information; and transmitting the second multi-hop information element to the device which transmitted the first multi-hop information element.

Preferably, the first multi-hop information element may be included in a beacon frame received by the final destination device, and the second multi-hop information element may be generated by the final destination device.

Preferably, the device which transmitted the first multi-hop information element may be a neighboring device of the current device, which belongs to the same beacon group as does the current device.

Preferably, the first multi-hop information element may include a field for indicating the amount of required resources and a field for indicating a hop count. The amount of required resources may be the number of Medium Access Slots (MASs).

Preferably, the determining whether to select the multi-hop route may be configured to determine whether to select the multi-hop route by primarily considering the number of required MASs and secondarily considering the hop count.

Preferably, the resource allocation information may be information about allocated time slots.

Preferably, the second multi-hop information element including a reservation status bit having a preset value may be transmitted to the device which transmitted the first multi-hop information element so as to release the multi-hop route.

In addition, in accordance with a further aspect of the present invention to accomplish the above objects, there is provided a multi-hop communication method based on distributed medium access control, including, from the standpoint of an intermediate device, receiving a first multi-hop information element generated to search for a multi-hop route and determining whether a final destination of the multi-hop route is a current device; if the final destination is not the current device, determining whether a device to be used for the multi-hop route is present in neighboring devices of the current device; if the device to be used for the multi-hop route is present, generating a second multi-hop information element which includes a hop count obtained by adding 1 to a hop count corresponding to the first multi-hop information element; and transmitting a beacon frame, which includes the second multi-hop information element, to the device to be used for the multi-hop route.

Preferably, the first multi-hop information element may be included in a beacon frame received by the intermediate device, and the second multi-hop information element may be included in a beacon frame transmitted from the intermediate device.

Preferably, if a device to be used for the multi-hop route is not present, searching for the multi-hop route may be stopped.

Preferably, the second multi-hop information element may be configured such that a number, obtained by adding the number of required MASs calculated by the current device to the number of required MASs included in the first multi-hop information element, is included in a field for indicating the number of required MASs of the second multi-hop information element.

BRIEF DESCRIPTION OF THE DRAWINGS

The above and other objects, features and advantages of the present invention will be more clearly understood from the following detailed description taken in conjunction with the accompanying drawings, in which:

FIG. 4 is a diagram showing an example of a multi-hop information element added for a multi-hop communication method based on distributed medium access control according to an embodiment of the present invention;

FIG. 5 is a diagram showing an example of an MDRP control field shown in FIG. 4;

DESCRIPTION OF THE PREFERRED EMBODIMENTS

Figure 1:
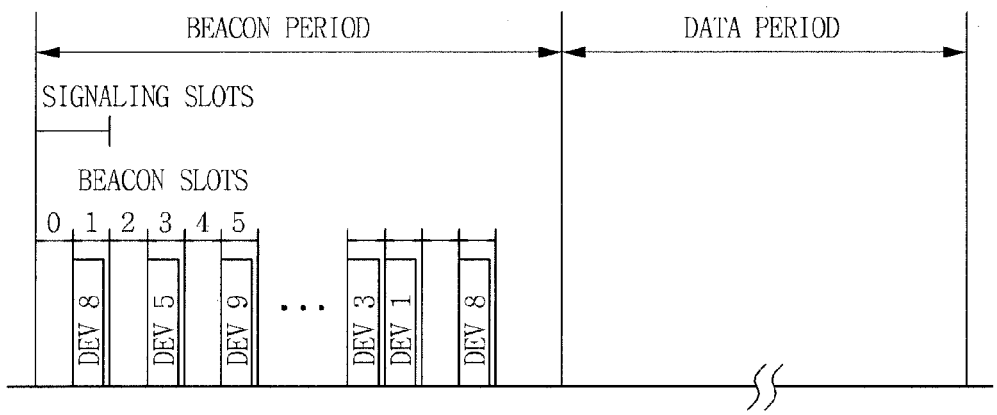
FIG. 1 is a diagram showing the structure of the MAC superframe of the WiMedia Alliance.

The present invention will be described in detail with reference to the attached drawings. If in the specification, detailed descriptions of well-known functions or configurations may unnecessarily make the gist of the present invention obscure, the detailed descriptions will be omitted. The embodiments of the present invention are provided to more completely describe the present invention to those skilled in the art. Therefore, the shapes and sizes of components in the drawings may be exaggerated for clearer descriptions.

Hereinafter, embodiments of the present invention will be described in detail with reference to the attached drawings.

FIG. 1 is a diagram showing the structure of the Media Access Control (MAC) superframe of the WiMedia Alliance.

Referring to FIG. 1, a superframe having a length of 65,536 µs is composed of 256 time slots, each having a length of 256 µs and being called a Medium Access Slot (MAS).

Each superframe starts with a Beacon Period (BP), and the start of the first MAS of the BP is called a Beacon Period Start Time (BPST). The MASs of the superframe, except for the BP, constitute a data period in which data is transmitted and which is composed of Prioritized Contention Access (PCA) periods and Distributed Reservation Protocol (DRP) periods.

Figure 2:
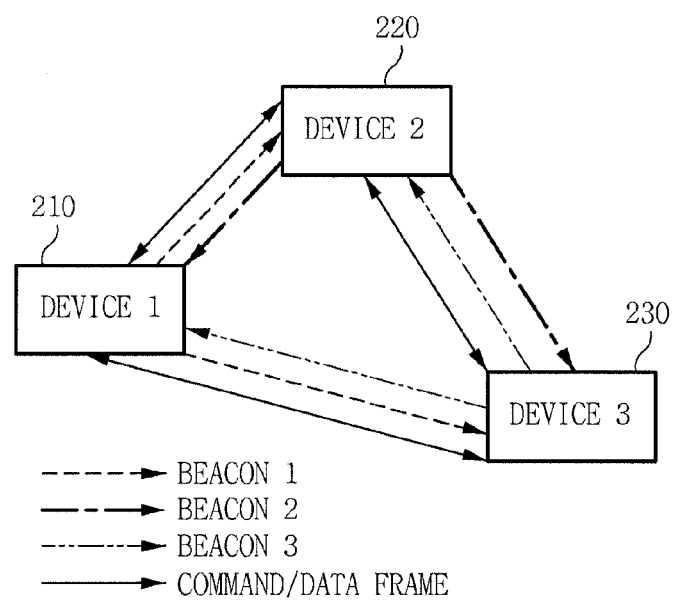
FIG. 2 is a diagram showing the single beacon group of the WiMedia Alliance.

FIG. 2 is a diagram showing the single beacon group of the WiMedia Alliance.

Referring to FIG. 2, it can be seen that in the MAC protocol of the WiMedia Alliance, all devices have the same function so that they can be distributively operated without requiring a central control unit. That is, each of devices 210, 220 and 230 transmits its own beacon and receives beacon from other devices in its beacon slot. Such a beacon frame includes information about network management, so that the synchronization of devices, the management of power, and the allocation of data periods may be performed.

For example, the device 210 searches the surroundings for a beacon, and then determines based on the results of the searching whether a BG operating around the device 210 is present. If it is determined that no BG is present, the device 210 transmits a beacon frame, which is generated based on Device Identification (DEVID), a device slot number, and device control information (BP Length, Beacon Slot Info Bitmap, and the device address corresponding to the Beacon Slot Info Bitmap), thus forming a new BG. In this case, other devices 220 and 230 individually search for this beacon frame, and generate and transmit their own beacon frames on the basis of information about the found beacon frame. Those devices (for example, the devices 210 and 220 or the devices 210 and 230) transmit and receive beacon frames therebetween, thus performing communication in a single-hop manner.

If it is determined as the results of the searching by the device 210 that a BG is present around the device 210, the device 210 can become a member of the BG by transmitting its own beacon to the BG.

Figure 3:
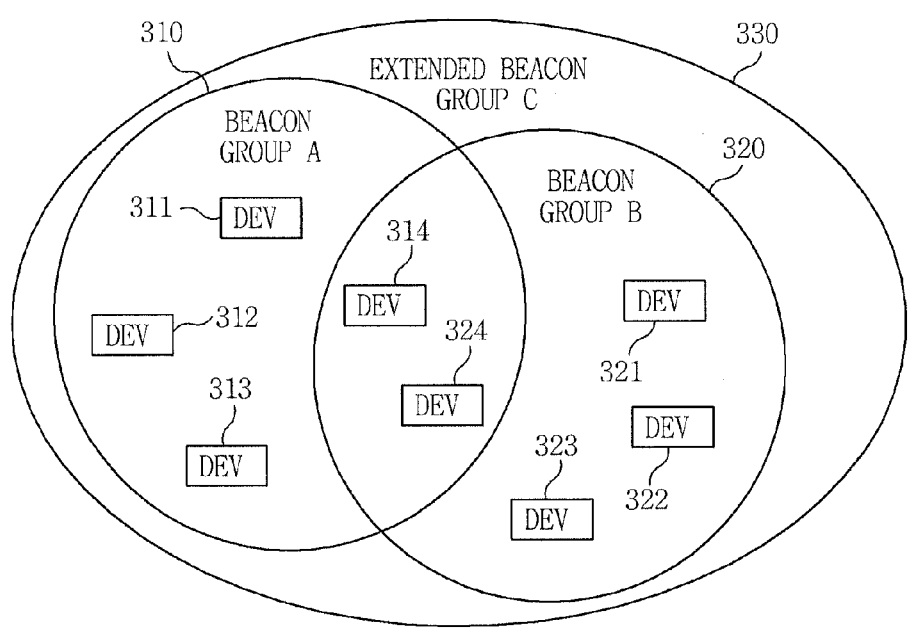
FIG. 3 is a diagram showing the extended beacon group of the WiMedia Alliance.

FIG. 3 is a diagram showing the Extended Beacon Group (EBG) of the WiMedia Alliance.

Referring to FIG. 3, devices using the same Beacon Period Start Time (BPST) form a single Beacon Group (BG).

That is, since devices 311, 312, 313, 314, and 324 share the same BPST among themselves, they form a beacon group 310. Likewise, since devices 314, 321, 322, 323, and 324 share the same BPST, they form a beacon group 320.

Further, an EBG is formed using sets of the BGs of the devices that belong to the BGs.

That is, because the devices 314 and 324 belong to the beacon group 310 and also belong to the beacon group 320, the two beacon groups are extended by the medium of the two devices 314 and 324 and form an EBG 330.

According to the present invention, the device 311 present in the beacon group 310 can perform multi-hop communication with the external device 321 present in the beacon group 320 by the medium of the device 314 also present in the beacon group 320, thus enabling multi-hop communication to be performed between two devices present in different beacon groups.

FIG. 4 is a diagram showing an example of a multi-hop information element added for the multi-hop communication method based on distributed medium access control according to an embodiment of the present invention.

Referring to FIG. 4, a multi-hop information element (that is, multi-hop DRP Information Element; MDRP IE) added for the multi-hop communication method based on distributed medium access control according to the embodiment of the present invention includes an element ID field 410, a length field 420, an MDRP control field 430, a target/owner device address field 441, a source address field 442, a destination address field 443, a minimum bandwidth field 451, a desired bandwidth field 452, a hop count field 460, a MAS number field 470, a sequence number field 480, and MDRP allocation fields 490.

The present invention enables a routing (route setup) function to be performed in a MAC layer, rather than in a network layer, so that a new MDRP IE is added to the MAC layer of the WiMedia Alliance which is currently premised just on single-hop communication, thus enabling single-hop communication to be extended to multi-hop communication.

The element ID field 410 indicates the ID of an information element.

The length field 420 indicates the byte-based length of the information element, except for the element ID field 410 and the length field 420.

The MDRP control field 430 will be described in detail later with reference to FIG. 5.

The target/owner device address field 441 indicates the ID of a destination device to which the MDRP IE is to be transmitted. The target/owner device address field 441 may be set as '0xffff' in the case of broadcasting.

The source address field 442 indicates the ID of an initial source device which is requesting a route.

The destination address field 443 indicates the ID of the final destination device of the route.

The minimum bandwidth field 451 indicates the minimum bandwidth required to transmit data requested by the MAC client of the source device, and the unit of the minimum bandwidth may be in Kbps.

The desired bandwidth field 452 indicates the bandwidth requested to be allocated if possible in order to transmit data requested by the MAC client of the source device, and the unit of the desired bandwidth may be in Kbps.

The hop count field 460 finally indicates the number of hops from the source device to the destination device, and increases by 1 whenever it passes through an intermediate device.

The MAS number field 470 finally indicates the number of MASs from the source device to the destination device, and increases by the number of required MASs whenever it passes through an intermediate device.

The sequence number field 480 indicates the sequence number of an MDRP IE, and is used to classify a message.

The MDRP allocation field 490 includes 2-byte zone bitmap information and 2-byte MAS bitmap information. Here, a zone is composed of 16 MASs, and 16 zones may be present in a single superframe.

FIG. 5 is a diagram showing an example of the MDRP control field shown in FIG. 4.

Referring to FIG. 5, the MDRP control field of FIG. 4 includes an unsafe field 510, a conflict tie-breaker field 520, an owner field 530, a reservation status field 540, a reason code field 550, a stream index field 560, and a reservation type field 570.

The unsafe field 510 indicates whether a current MAS is a MAS exceeding a threshold for resource allocation.

The conflict tie-breaker field 520 is randomly set to '0' or '1' when resources are allocated, and must have the same value with respect to the same MDRP IE.

The owner field 530 is set to '1' when a device using a relevant MDRP IE transmits data, and is set as '0' when the device receives data.

The reservation status field 540 is set to '1' when resource allocation has been completed.

The reason code field 550 indicates the following meanings depending on the set values.
  0: "Accepted" indicating that a request for DRP reservation has been completed.
  1: "Conflict" indicating that a conflict is present in a request for DRP reservation.
  2: "Pending" indicating that a request for DRP reservation is pending.
  3: "Denied" indicating that a request for DRP reservation has been denied.
  4: "Modified" indicating that a request for DRP reservation has been modified.
  5: "Route error" indicating that an error has occurred in a link.

The stream index field 560 indicates the ID of a stream that is transmitted using a relevant MDRP IE.

The reservation type field 570 indicates the following meanings depending on the set values.
  0: "Alien BP" indicating the BP of another BG.
  1: "Hard" indicating that only a source device can use resources.
  2: "Soft" indicating that the source device primarily uses resources, but other devices can competitively use resources when the source device does not use the resources.
  3: "Private" indicating that a resource allocation method defined by a vendor is applied.
  4: "PCA" indicating that resources can be used in a CSMA/CA manner.

In this case, CSMA refers to carrier sense multiple access and CA refers to collision avoidance.

Figure 6:
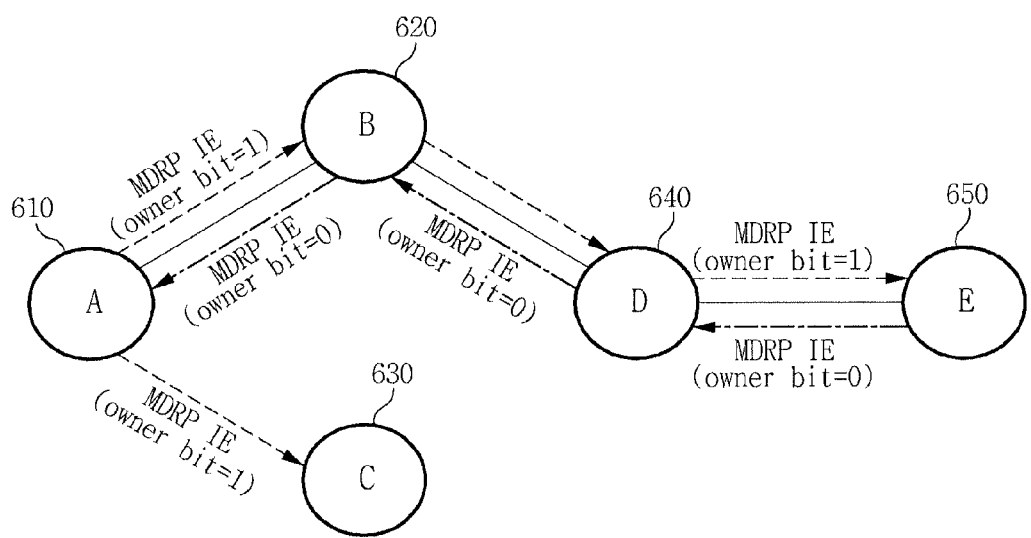
FIG. 6 is a diagram showing a routing procedure for multi-hop communication.

FIG. 6 is a diagram showing a routing procedure for multi-hop communication.

Referring to FIG. 6, a procedure for setting up a route from a device A 610 which is an initial source device to a device E 650 which is a final destination device can be seen.

That is, when the device A 610 transmits a beacon frame, including an MDRP IE, to the external device E 650 which does not belong to its own beacon group so as to set up a multi-hop route, devices B 620 and C 630, having received the beacon frame, generate MDRP IEs including their own pieces of information, and transmit these MDRP IEs to the surroundings. This procedure is repeated, so that the device E 650, that is, the final destination device, receives a beacon frame including an MDRP IE. However, when there is no candidate device in the surroundings, as in the case of the device C, searching for a route may be stopped.

In particular, MDRP IEs which are transmitted from the initial source device, that is, the device A 610, to the final destination device, that is, the device E 650, are configured such that the owner bits thereof can be set to '1'.

In the case where the device E 650 receives the MDRP IE requesting routing from the device A 610, when MDRP IEs have been received from a plurality of devices, the device E 650 selects a device having a minimum number of MASs by referring to MAS number fields, and when the numbers of MASs are identical among the devices, the device E 650 selects a device having the minimum hop count by referring to hop count fields. If the numbers of MASs are identical and the hop counts are also identical among the devices, the device E 650 selects the device that arrived earlier.

The device E 650 transmits an MDRP IE, which is generated by allocating channel time resources such as MASs, by including this channel time resource allocation information in the MDRP allocation field of the MDRP IE, and by setting the owner bit to '0', to the device D 640.

The device D 640 transmits an MDRP IE, which is generated by adding its own channel time resource allocation information to the MDRP allocation field of the MDRP IE and by setting the owner bit to '0', to the device B 620.

The device B 620 transmits an MDRP IE, which is generated by adding its own channel time resource allocation information to the MDRP allocation field of the MDRP IE and by setting the owner bit to '0', to the device A 610.

The device A 610 completes the setup of the multi-hop route to the device E 650 on the basis of the received MDRP IE, and transmits data to the device E 650.

In this way, the device A 610 can detect information about the device E 650 present outside the beacon group by receiving a beacon frame, and can set up the multi-hop route to the device E 650.

When receiving a plurality of MDRP IEs, the device E 650 may select an intermediate device on the basis of the allocable channel time resources, hop counts, and link status which correspond to a range from the source device to the destination device.

Hereinafter, a procedure for setting up a route from the device A 610, that is, the initial source device, to the device E 650, that is, the final destination device, will be described in detail with reference to FIG. 7.

Figure 7:
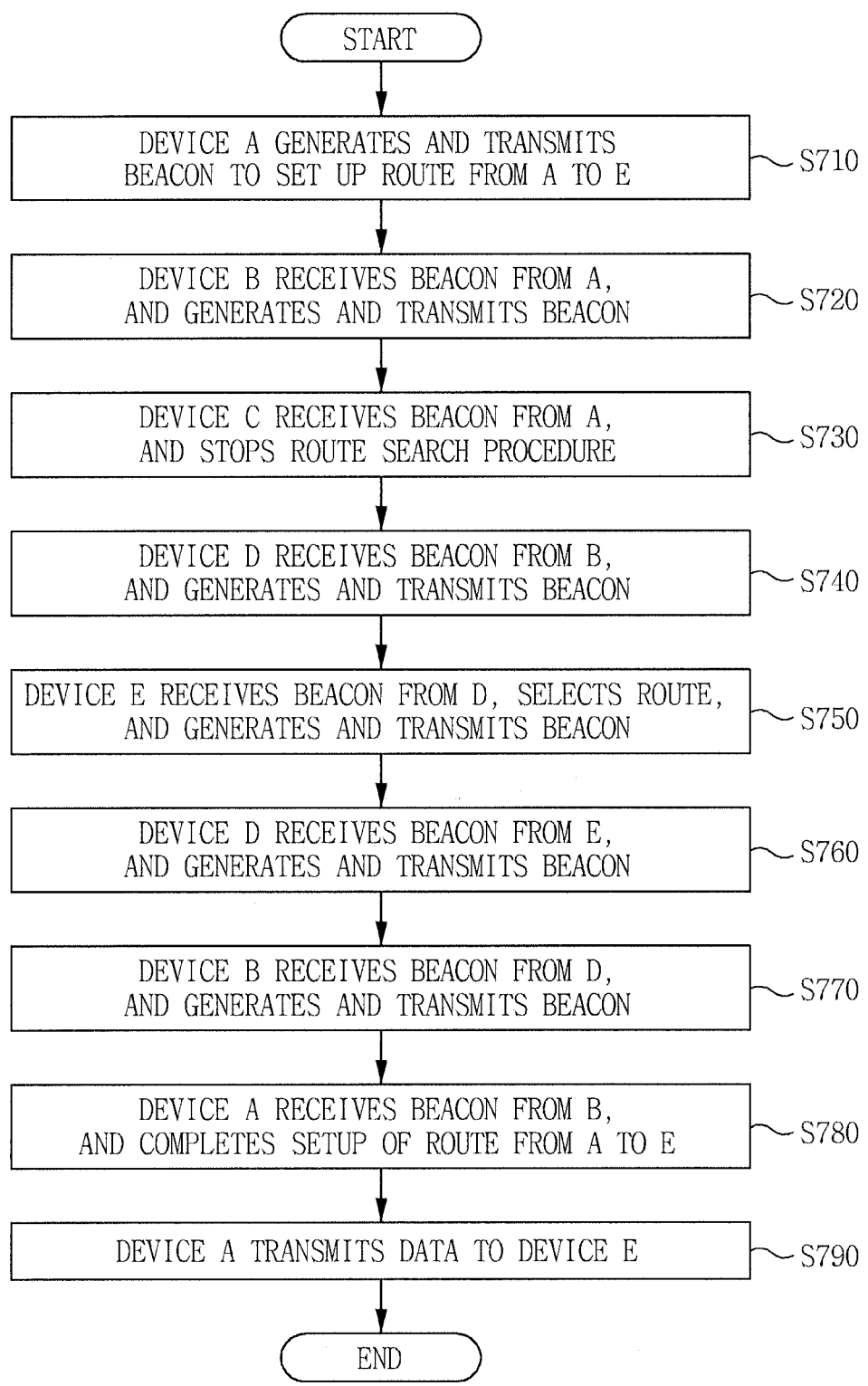
FIG. 7 is an operating flowchart showing the routing procedure of the multi-hop communication method based on distributed medium access control according to an embodiment of the present invention.

FIG. 7 is an operating flowchart showing the routing procedure of the multi-hop communication method based on distributed medium access control according to an embodiment of the present invention.

Referring to FIG. 7, in the multi-hop communication method based on distributed medium access control according to the embodiment of the present invention, the device A generates an MDRP IE and transmits a beacon frame including the MDRP IE so as to transmit data to the device E at step S710.

That is, the device A receives a request for the transmission of data to the device E from a MAC client, and searches its own routing table for a route. Thereafter, when the device A does not know the route, it initiates a route search procedure based on an MDRP IE.

In this case, after receiving beacon frames from other devices in a relevant beacon group, the device A calculates the number of required MASs (=a) of each device in consideration of the data rates, minimum bandwidths, desired bandwidths, etc., supported by the respective devices from which the beacon frames have been received, and detects neighboring devices B and C which can accommodate the MASs by analyzing the received beacon frames.

The device A generates an MDRP IE (Target/Owner DevAddr=B, SrcAddr=A, DestAddr=E, MASNum=a, HopCnt=1, MinBW, DesiredBW, . . . ) and an MDRP IE (Target/Owner DevAddr=C, SrcAddr=A, DestAddr=E, MASNum=a, HopCnt=1, MinBW, DesiredBW, . . . ), includes the MDRP IEs in beacon frames, and then transmits these beacon frames.

After receiving beacon frames from other devices in the beacon group, as well as receiving the beacon frame of the device A which includes the MDRP IE, the device B calculates the number of required MASs (=b) of each device in consideration of the data rates, minimum bandwidths, desired bandwidths, etc., supported by the respective devices from which the beacon frames have been received, and detects a neighboring device D which can accommodate the MASs. Further, the device B generates an MDRP IE (Target/Owner DevAddr=D, SrcAddr=A, DestAddr=E, MASNum=a+b, HopCnt=2, MinBW, DesiredBW, . . . ), includes the MDRP IF in a beacon frame, and then transmits this beacon frame at step S720.

In this case, the device B updates the routing table as follows:

Dest(=A), NextHop(=A), HopCnt(=1)

After receiving beacon frames from other devices in the beacon group, as well as receiving the beacon frame of the device A which includes the MDRP IE, the device C calculates the number of required MASs of each device in consideration of the data rates, minimum bandwidths, desired bandwidths, etc., supported by the respective devices from which the beacon frames have been received, and stops the route search procedure based on an MDRP IE if a neighboring device capable of accommodating the MASs is not detected at step S730.

Further, after receiving beacon frames from other devices in the beacon group, as well as receiving the beacon frame of the device B which includes the MDRP IE, the device D calculates the number of required MASs (=d) of each device in consideration of the data rates, minimum bandwidths, desired bandwidths, etc., supported by the respective devices from which the beacon frames have been received, and detects a neighboring device E capable of accommodating the MASS. The device D generates an MDRP IE (Target/Owner DevAddr=E, SrcAddr=A, DestAddr=E, MASNum=a+b+d, HopCnt=3, MinBW, DesiredBW, . . . ), includes the MDRP IE in a beacon frame, and then transmits this beacon frame at step S740.

In this case, the device D updates the routing table as follows:

Dest(=B), NextHop(=B), HopCnt(=1)
Dest(=A), NextHop(=B), HopCnt(=2)

After receiving beacon frames from other devices in the beacon group, as well as receiving the beacon frame of the device D which includes the MDRP IE, the device E selects a route, generates an MDRP IE, includes the MDRP IE in a beacon frame, and then transmits this beacon frame at step S750.

In this case, when receiving MDRP IEs from two or more devices, the device E selects an optimal route as follows:
- select a device having a minimum MASNum value
- select a device having a minimum HopCnt value when MASNum values are identical to one another
- select a device which arrived first when MASNum values are identical and HopCnt values are also identical At this time, the device E updates the routing table as follows:
Dest(=D), NextHop(=D), HopCnt(=1)
Dest(=A), NextHop(=D), HopCnt(=3)

In this case, the device E generates an MDRP IE (Target/Owner DevAddr=D, SrcAddr=A, DestAddr=E, HopCnt=1, DRP Allocation, . . . ), includes the MDRP IE in a beacon frame, and then transmits this beacon frame to an optimal route.

After receiving beacon frames from other devices in the beacon group, as well as receiving the beacon frame of the device E which includes the MDRP IE, the device D generates an MDRP IE (Target/Owner DevAddr=B, SrcAddr=A, DestAddr=E, HopCnt=2, DRP Allocation, . . . ), includes the MDRP IE in a beacon frame and then transmits this beacon frame to an optimal route at step S760.

In this case, the device D updates the routing table as follows:
Dest(=B), NextHop(=B), HopCnt(=1)
Dest(=A), NextHop(=B), HopCnt(=2)
Dest(=E), NextHop(=E), HopCnft=1)

After receiving beacon frames from other devices in the beacon group, as well as receiving the beacon frame of the device D which includes the MDRP IE, the device B generates an MDRP IE (Target/Owner DevAddr=A, SrcAddr=A, DestAddr=E, HopCnt=3, DRP Allocation, . . . ), includes the MDRP IE in a beacon frame and then transmits this beacon frame to an optimal route at step S770.

In this case, the device B updates the routing table as follows:
Dest(=A), NextHop(=A), HopCnt(=1)
Dest(=D), NextHop(=D), HopCnt(=1)
Dest(=E), NextHop(=D), HopCnft=2)

Further, after receiving beacon frames from other devices in the beacon group, as well as receiving the beacon frame of the device B which includes the MDRP IE, the device A determines that the setup of the optimal route to the final destination E has been completed at step S780.

In this case, the device A updates the routing table as follows:
Dest(=B), NextHop(=B), HopCnt(=1)
Dest(=E), NextHop(=B), HopCnt(=3)

When the setup of the optimal route has been completed, the device A transmits data to the device B which is the next local destination, the device B transmits the data to the device D with reference to the routing table, and the device D transmits the data to the device E with reference to the routing table at step S790.

The device E having received the data may transmit the received data to the MAC client.

Figure 8:
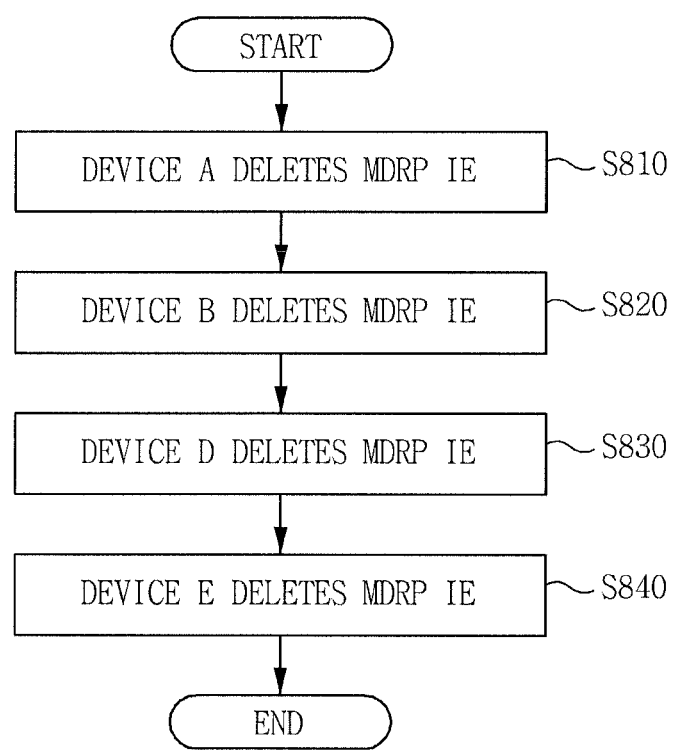
FIG. 8 is an operating flowchart showing a route release procedure performed by an initial source device according to an embodiment of the present invention.

FIG. 8 is an operating flowchart showing a route release procedure performed by an initial source device according to an embodiment of the present invention.

Referring to FIG. 8, it can be seen that when a route from the device A, that is, an initial source device, to the device E, that is, a final destination device, is set up as shown in FIG. 6, the device A can release MDRP IEs.

When a beacon frame or any frame has not been received four or more times, forward and reverse MDRP IEs can be released.

The device A initiates the release the reservation of resources by deleting from a beacon frame an MDRP IE from the device A to the device B at step S810.

After receiving the beacon frame from the device A, the device B deletes from the beacon frame the MDRP IE from the device A to the device B, and also deletes from the beacon frame an MDRP IE from the device B to the device D, which is related to the next forward hop, thus releasing the reservation of resources at step S820.

After receiving the beacon frame from the device B, the device D deletes from the beacon frame the MDRP IE from B to D, and also deletes from the beacon frame an MDRP IE from D to E, which is related to the next forward hop, thus releasing the reservation of resources at step S830.

After receiving the beacon frame from the device D, the device E deletes from the beacon frame the MDRP IE from D to E, thus releasing the reservation of resources at step S840.

Figure 9:
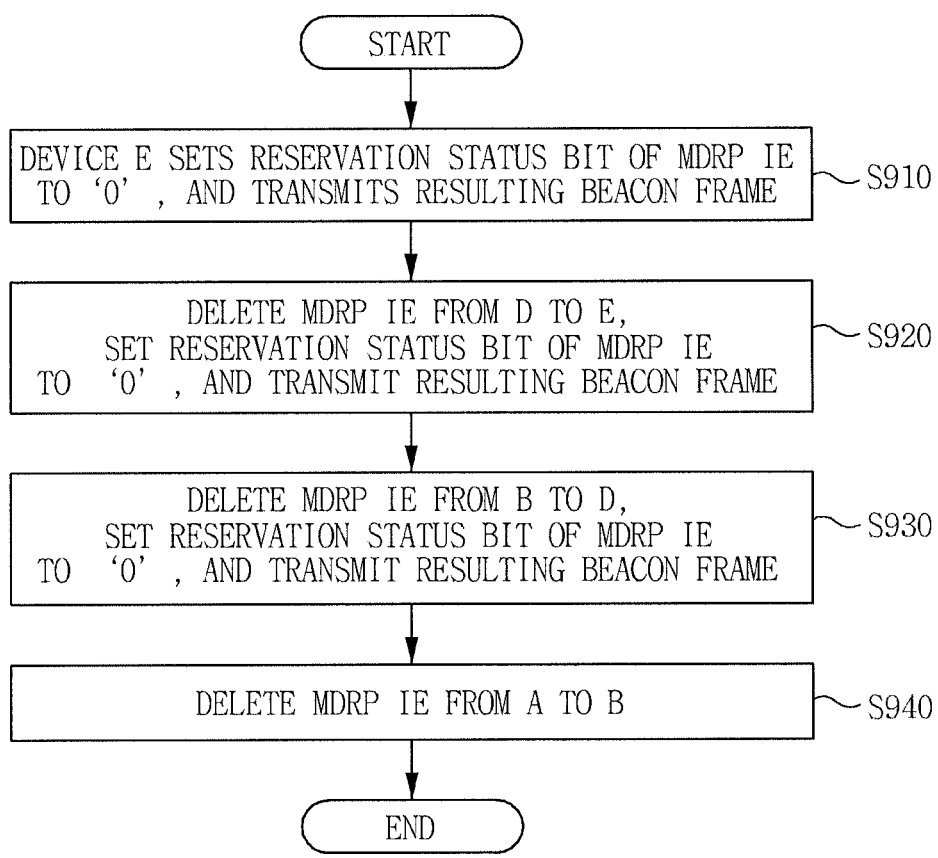
FIG. 9 is an operating flowchart showing a route release procedure performed by a final destination device according to an embodiment of the present invention.

FIG. 9 is an operating flowchart showing a route release procedure performed by a final destination device according to an embodiment of the present invention.

Referring to FIG. 9, it can be seen that when a route from the device A, that is, an initial source device, to the device E, that is, a final destination device, is set up as shown in FIG. 6, the device E can release MDRP IEs.

The device E sets the reservation status bit of an MDRP IE from the device D to the device E to '0' and transmits a resulting beacon frame, thus initiating the release of the reservation of resources at step S910.

After receiving the beacon frame from the device E, the device D deletes from the beacon frame the MDRP IE from the device D to the device E, sets the reservation status bit of an MDRP IE from the device B to the device D, which is related to the next reverse hop, to '0', and then transmits a resulting beacon frame at step S920.

After receiving the beacon frame from the device D, the device B deletes from the beacon frame the MDRP IE from the device B to the device D, sets the reservation status bit of an MDRP IE from the device A to the device B, which is related to the next reverse hop, to '0', and then transmits a resulting beacon frame at step S930.

After receiving the beacon frame from the device B, the device A deletes from the beacon frame the MDRP IE from the device A to the device B, thus releasing the reservation of resources at step S940.

The individual steps described with reference to FIGS. 7 to 9 can be performed in the order of FIGS. 7 to 9, in the inverse order thereof, or simultaneously.

As described above, in the multi-hop communication method based on distributed medium access control according to the present invention, constructions and methods described in the above embodiments are not limitedly applied, but part or all of those embodiments can be selectively combined and constructed so that various modifications are possible.

According to the present invention, it is possible to perform multi-hop communication between devices in an Extended Beacon Group (EBG), as well as single-hop communication between devices only in a single beacon group based on distributed medium access control.

Further, the present invention can provide multi-hop information elements that can be effectively used in multi-hop communication based on distributed medium access control.

Furthermore, the present invention enables an optimal route to be set up in distributed medium access control-based multi-hop communication that uses multi-rate.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-hop communication method based on distributed medium access control, comprising:

generating a beacon frame which includes a first multi-hop information element and transmitting the beacon frame to a neighboring device so as to search for a route to an external device which does not belong to a beacon group;

receiving a third multi-hop information element from the neighboring device, the third multi-hop information element generated based on a second multi-hop information element, the second multi-hop information element generated by the external device; and setting up a multi-hop route to the external device in accordance with the third multi-hop information element to transmit data to the external device, wherein each of the first multi-hop information element, the second multi-hop information element, and the third multi-hop information element includes a field for indicating an initial source of the route, a field for indicating a final destination of the route, a field for indicating a hop count, and a field for indicating an amount of required resources, and wherein each of the second multi-hop information element and the third multi-hop information element further includes a field for indicating resource allocation information, and wherein the amount of required resources is a number of required medium access slots, and the resource allocation information is information about allocated time slots, and wherein the third multi-hop information element includes the resource allocation information included in the second multi-hop information element.

2. The multi-hop communication method as set forth in claim 1, wherein the multi-hop route is released by using a beacon frame from which the first multi-hop information element has been deleted.

3. A multi-hop communication method based on distributed medium access control, comprising:

receiving a first multi-hop information element generated to search for a multi-hop route and determining whether a final destination of the multi-hop route is a current device;

determining whether to select a multi-hop route including a device which transmitted the first multi-hop information element, if the final destination is the current device;

generating a second multi-hop information element including resource allocation information, if the multi-hop route is selected; and transmitting the second multi-hop information element to the device which transmitted the first multi-hop information element, wherein the first multi-hop information element includes a field for indicating an amount of required resources and a field for indicating a hop count, and wherein the amount of required resources is a number of required medium access slots, and the determining whether to select the multi-hop route is configured to determine whether to select the multi-hop route by primarily considering the number of required medium access slots and secondarily considering the hop count.

4. The multi-hop communication method as set forth in claim 3, wherein the resource allocation information is information about allocated time slots.

5. The multi-hop communication method as set forth in claim 3, wherein the second multi-hop information element including a reservation status bit having a preset value is transmitted to the device which transmitted the first multi-hop information element so as to release the multi-hop route.

6. A multi-hop communication method based on distributed medium access control, comprising:

receiving a first multi-hop information element generated to search for a multi-hop route and determining whether a final destination of the multi-hop route is a current device;

determining whether a device to be used for the multi-hop route is present among neighboring devices of the current device, if the final destination is not the current device;

generating a second multi-hop information element which includes a hop count obtained by adding 1 to a hop count corresponding to the first multi-hop information element, if the device to be used for the multi-hop route is present; and transmitting a beacon frame which includes the second multi-hop information element, to the device to be used for the multi-hop route, wherein the searching for the multi-hop route is stopped, if a device to be used for the multi-hop route is not present, and wherein the second multi-hop information element is configured such that a number, obtained by adding a number of required medium access slots calculated by the current device to a number of required medium access slots included in the first multi-hop information element, is included in a field for indicating a number of required medium access slots of the second multi-hop information element.

7. The multi-hop communication method as set forth in claim 6, wherein the multi-hop communication method is configured such that when a beacon frame from which the first multi-hop information element has been deleted is received after the multi-hop route has been set up, a beacon frame from which the second multi-hop information element has been deleted is transmitted to the device to be used for the multi-hop route.

8. The multi-hop communication method as set forth in claim 6, wherein the multi-hop communication method is configured such that when a third multi-hop information element including a reservation status bit having a preset value is received from the device to be used for the multi-hop route, the second multi-hop information element is deleted.

* * * * *